(12) United States Patent
Oya

(10) Patent No.: US 11,840,117 B2
(45) Date of Patent: Dec. 12, 2023

(54) RAMP-EQUIPPED VEHICLE

(71) Applicant: TOYOTA JIDOSHA KABUSHIKI KAISHA, Toyota (JP)

(72) Inventor: Kentaro Oya, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 247 days.

(21) Appl. No.: 17/479,394

(22) Filed: Sep. 20, 2021

(65) Prior Publication Data
US 2022/0126641 A1    Apr. 28, 2022

(30) Foreign Application Priority Data
Oct. 22, 2020 (JP) ................. 2020-177291

(51) Int. Cl.
| | | |
|---|---|---|
| *B60G 17/017* | (2006.01) | |
| *B60G 17/019* | (2006.01) | |
| *B60P 1/43* | (2006.01) | |

(52) U.S. Cl.
CPC ......... *B60G 17/017* (2013.01); *B60G 17/019* (2013.01); *B60P 1/433* (2013.01); *B60G 2400/90* (2013.01); *B60G 2401/14* (2013.01); *B60G 2800/914* (2013.01)

(58) Field of Classification Search
CPC .............. B60G 17/017; B60G 17/019; B60G 2400/90; B60G 2800/914; B60G 17/0195; B60P 1/433; B60P 1/02; B60P 1/43; A61G 3/061
See application file for complete search history.

(56) References Cited

FOREIGN PATENT DOCUMENTS

| | | | | |
|---|---|---|---|---|
| CA | 3012008 A1 | * | 1/2019 | ............. A61G 3/061 |
| CN | 106939748 A | | 7/2017 | |
| CN | 207657719 U | | 7/2018 | |
| DE | 102016116856 A1 | * | 3/2018 | ........... B60G 17/016 |
| JP | 2018-162042 A | | 10/2018 | |
| SE | 1250470 A1 | * | 11/2013 | |
| WO | WO-2013169182 A1 | * | 11/2013 | ........... B60G 17/017 |

* cited by examiner

*Primary Examiner* — Hung Q Nguyen
(74) *Attorney, Agent, or Firm* — Dinsmore & Shohl LLP

(57) ABSTRACT

A ramp-equipped vehicle includes: a vehicle-height adjusting mechanism configured to adjust a vehicle height of a vehicle; a ramp configured to be movable between a deployed state and a stored state, the deployed state being a state where the ramp protrudes outwardly from the vehicle, the stored state being a state where the ramp is stored inside the vehicle; and a camera configured to detect a person coming closer to the vehicle. When the camera detects a person coming closer to a doorway of the vehicle during vehicle height adjustment by the vehicle-height adjusting mechanism, the vehicle height adjustment by the vehicle-height adjusting mechanism is interrupted.

2 Claims, 6 Drawing Sheets

RAMP-EQUIPPED VEHICLE

CROSS-REFERENCE TO RELATED APPLICATION

This application claims priority to Japanese Patent Application No. 2020-177291 filed on Oct. 22, 2020, incorporated herein by reference in its entirety.

BACKGROUND

1. Technical Field

The present disclosure relates to a vehicle height control in a ramp-equipped vehicle.

2. Description of Related Art

In the related art, for the purpose of providing facility for getting on and off a vehicle with a wheelchair, a ramp-equipped vehicle that can deploy a ramp in a doorway of the vehicle has been used. In such a vehicle, ordinary passengers can get on and off the vehicle by use of the ramp, and thus, the passengers can easily get on and off the vehicle.

Here, the ramp is to be used when the vehicle stops and passengers get on and off the vehicle, and the ramp is stored in the vehicle during traveling. When the vehicle stops, the ramp is deployed (extended) and stored (contracted) in accordance with opening and closing of a door.

Further, in a ramp-equipped vehicle described in Japanese Unexamined Patent Application Publication No. 2018-162042 (JP 2018-162042 A), a ramp is moved by an actuator. Further, at this time, an image outside the vehicle is captured by a camera, and whether or not there are spaces for parking of the vehicle and ramp deployment is checked by automatic recognition. Further, in JP 2018-162042 A, whether or not a ramp deployment space has projections and recesses, whether or not there is any obstruction such as a pedestrian, and so on are also checked.

SUMMARY

Further, a ramp with a smaller angle is easily usable for users. In view of this, it is also known that a vehicle height is lowered when a ramp is deployed. Here, while the vehicle height is changing, the position of the ramp is also changing, and therefore, the ramp is used after the vehicle height is adjusted. However, such a case is also conceivable that, when a person who wants to get on a vehicle is running toward the vehicle (e.g., the person is about to rush into the vehicle), the person does not find the vehicle height under adjustment. Accordingly, there is room for improvement in consideration of people who are about to get on a vehicle during vehicle height adjustment.

A ramp-equipped vehicle according to the present disclosure includes a vehicle-height adjusting mechanism, a ramp, and a camera. The vehicle-height adjusting mechanism is configured to adjust a vehicle height of the vehicle. The ramp is configured to be movable between a deployed state and a stored state, the deployed state being a state where the ramp protrudes outwardly from the vehicle, the stored state being a state where the ramp is stored inside the vehicle. The camera is configured to detect a person coming closer to the vehicle. When the camera detects a person coming closer to a doorway of the vehicle during vehicle height adjustment by the vehicle-height adjusting mechanism, the vehicle height adjustment by the vehicle-height adjusting mechanism is interrupted.

Further, the ramp-equipped vehicle may further include a checking unit configured to check whether or not the person coming closer to the vehicle is a boarding scheduled person, by communicating with a terminal of the boarding scheduled person. When the checking unit confirms that the person coming closer to the vehicle is the boarding scheduled person during the vehicle height adjustment, the vehicle height adjustment may be interrupted.

With the present disclosure, it is possible to restrain occurrence of such a situation that a person who is rushing into a vehicle during vehicle height adjustment sways.

BRIEF DESCRIPTION OF THE DRAWINGS

Features, advantages, and technical and industrial significance of exemplary embodiments will be described below with reference to the accompanying drawings, in which like signs denote like elements, and wherein.

DETAILED DESCRIPTION OF EMBODIMENTS

The following describes an embodiment of the present disclosure with reference to drawings. Note that the present disclosure is not limited to the embodiment described herein.

Overall Configuration

Figure 1:
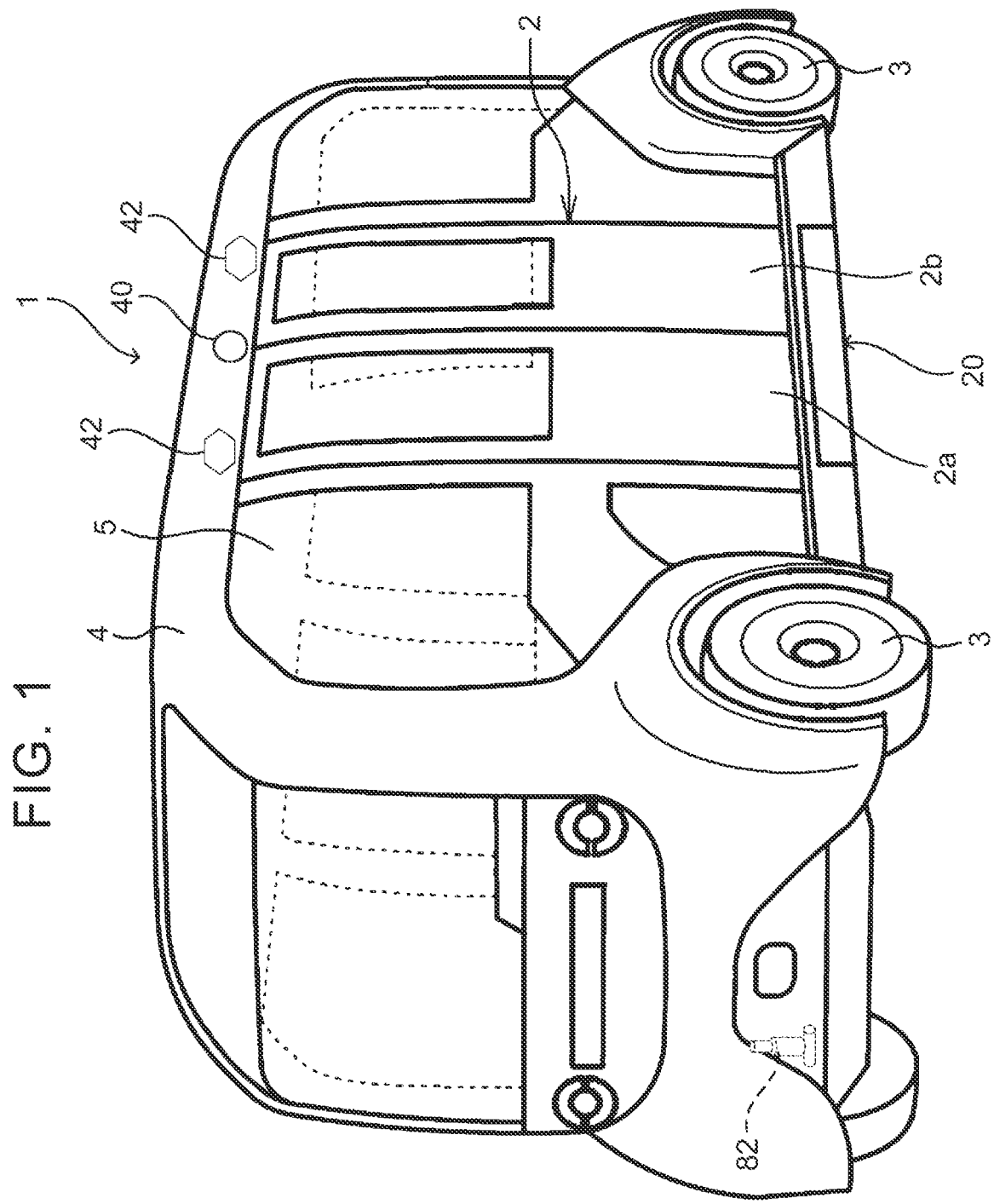
FIG. 1 is a perspective view of a ramp-equipped vehicle according to an embodiment.
Figure 2:
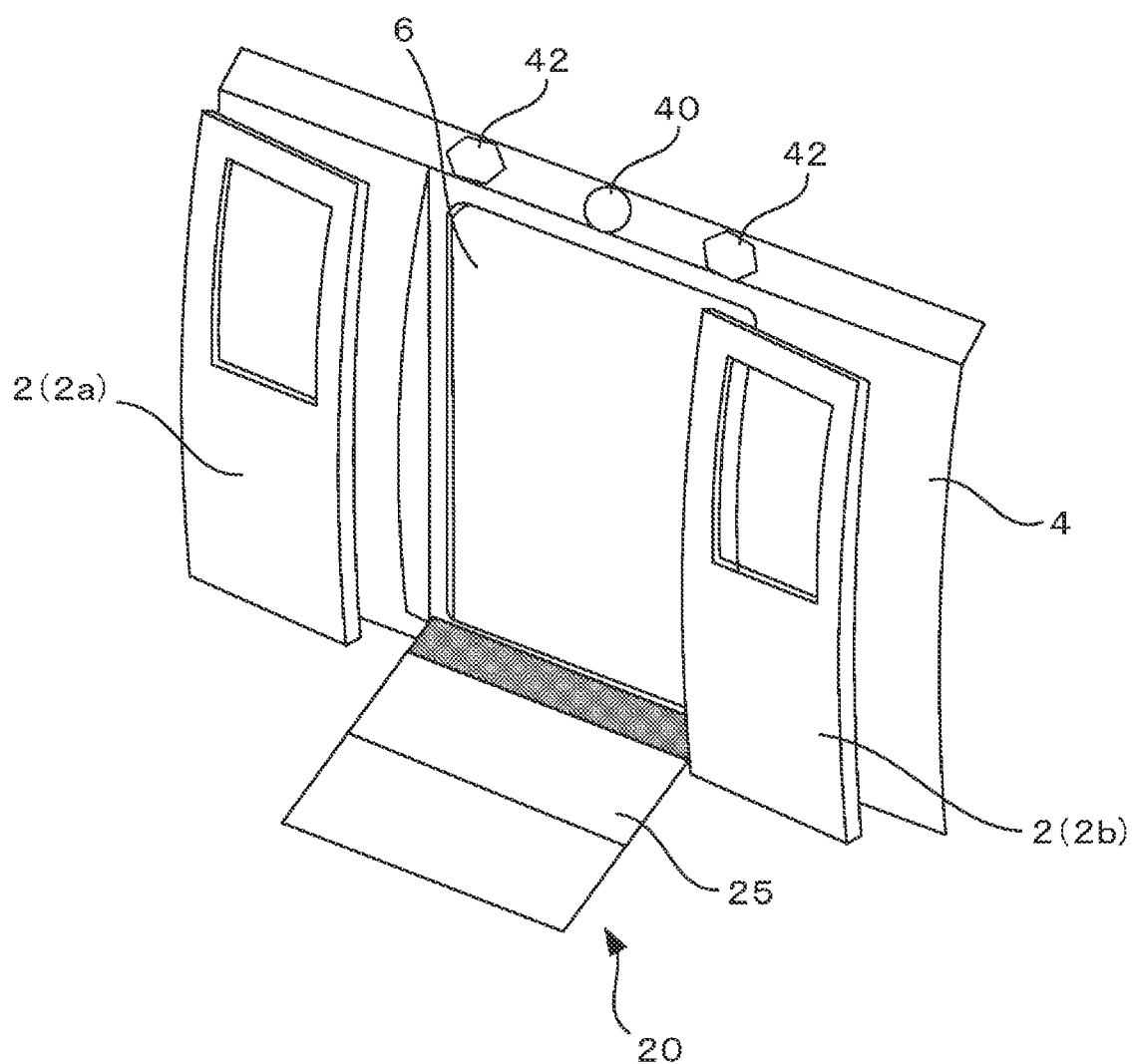
FIG. 2 is a partial enlarged perspective view of a left side face of the vehicle in a state (a deployed state) where a slide door is opened, and a ramp protrudes outwardly.

FIG. 1 is a perspective view of a ramp-equipped vehicle according to an embodiment, and FIG. 2 is a partial enlarged perspective view of a left side face of a vehicle 1 in a state (a deployed state) where a slide door 2 is opened, and a ramp protrudes outwardly from the vehicle 1.

In the present embodiment, the vehicle 1 is an electric vehicle configured to be driven by a motor, and the vehicle 1 can travel by self-driving. Further, the vehicle 1 includes tires 3 provided at four corners of a lower part of a vehicle body 4, and the vehicle 1 can be a four-wheel drive vehicle by employing a wheel-in motor for the tires 3. The vehicle body 4 includes windows 5 on four side faces, and in the present embodiment, the slide door 2 is provided on a left side face that is one of the side faces. An electric ramp device 20 is provided on the lower side of the slide door 2 of the vehicle body 4.

The slide door 2 includes two doors 2a, 2b and opens and closes a doorway 6 such that the doors 2a, 2b slide in the vehicle front-rear direction (to the opposite sides) by a door opening and closing mechanism (not illustrated).

In a normal time, a ramp 25 is stored inside the vehicle 1, e.g., under a floor or the like (see FIG. 1), and at the time when a person gets on or off the vehicle 1, the electric ramp device 20 deploys the ramp 25 such that the ramp 25 protrudes outwardly (see FIG. 2). The ramp 25 is useful particularly when a user on a wheelchair gets on or off the vehicle 1. The ramp 25 may be deployed only in this case, but the ramp 25 may be also deployed when there is no user on a wheelchair.

The electric ramp device 20 includes the ramp 25 and a ramp drive mechanism (not illustrated). The ramp 25 may be constituted by three plates and stored in an overlapping manner, for example, and the ramp 25 may be deployed such that the three plates move relative to each other. The plates should be movable relative to each other and inseparable from each other.

Further, respective axles of the four tires 3 are attached to the vehicle body 4 via suspension members (not illustrated). The suspension members include respective vehicle-height adjusting mechanisms 82. The vehicle-height adjusting mechanisms 82 are stretchable and contractible by a hydraulic pressure (fluid pressure), for example, and adjust a vehicle height of the vehicle 1. In the present embodiment, when the slide door 2 is to be opened and the ramp 25 is to be deployed at the time when the vehicle 1 stops, the vehicle height is lowered, and when the slide door 2 is to be closed and the ramp 25 is to be stored, the vehicle height is raised.

A camera 40 and projection devices 42 are provided on a side portion of the vehicle body 4, the side portion being above the slide door 2. The camera 40 captures an image of a user or the like coming closer to the vehicle 1, around the vehicle 1. Further, the projection devices 42 exhibit a necessary display outside the doorway 6, and in the present embodiment, the projection devices 42 display a stereo image such as a hologram on the ramp 25.

System Configuration

Figure 3:
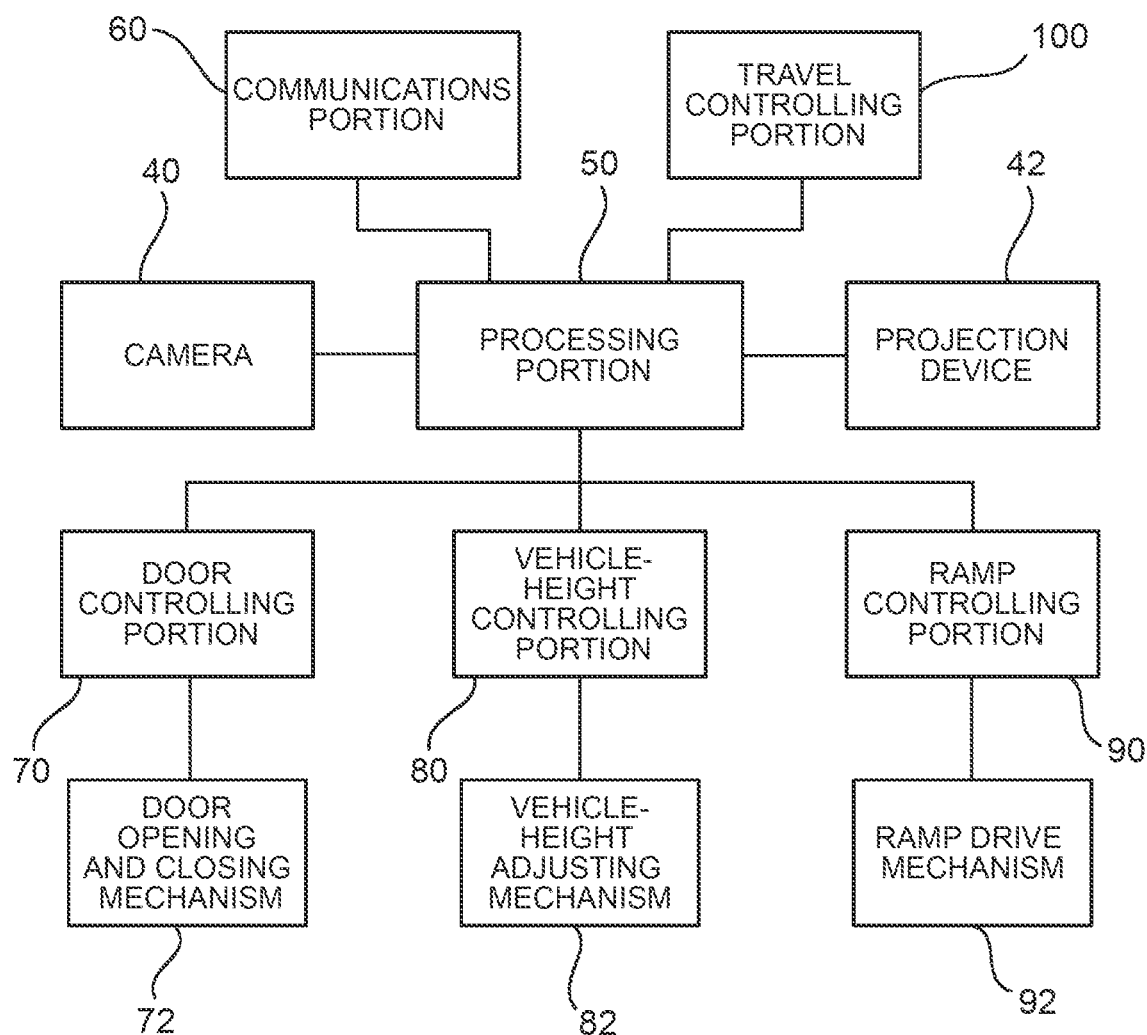
FIG. 3 is a block diagram illustrating a system configuration to perform various controls in the ramp-equipped vehicle according to the embodiment.

FIG. 3 is a block diagram illustrating a system configuration to perform various controls in the ramp-equipped vehicle according to the embodiment.

A travel controlling portion 100 controls traveling of the vehicle 1. As described above, the vehicle 1 is a self-driving vehicle and travels by self-driving on a predetermined route by referring to map data, a front image obtained by the camera, and so on. For this purpose, various pieces of information are supplied to the travel controlling portion 100, and the travel controlling portion 100 controls a drive motor, a brake, a steering mechanism, and so on based on these pieces of information. Note that the vehicle 1 may be a normal vehicle to be operated by a driver, or even in a case where the vehicle 1 is a self-driving vehicle, vehicle start, opening and closing of the slide door 2, and so on may be performed by a button operation or the like by an occupant. Further, as for the self-driving, the vehicle 1 communicates with an external operation management center or the like so as to acquire data necessary to control the self-driving. Accordingly, the travel controlling portion 100 may have a communications function, or the vehicle 1 may perform various types of communication by use of a communications portion 60 (described later).

A processing portion 50 is constituted by a computer and performs various types of data processing. The camera 40 captures images around the vehicle 1, and the images thus captured are supplied to the processing portion 50. The processing portion 50 detects a person around the slide door 2 of the vehicle 1 from the images thus supplied. Particularly, the processing portion 50 specifies whether or not there is a person directed toward the vehicle 1 by running (e.g., a person who is about to rush into the vehicle 1).

The communications portion 60 performs wireless communication with external devices and can perform various types of communication. As described above, the vehicle 1 communicates with the operation management center or the like so as to acquire data necessary to control the self-driving. In the meantime, the communications portion 60 communicates with a portable terminal possessed by a person coming closer to the vehicle 1. The portable terminal is a smartphone or the like. The communication may be direct short-distance communication or communication via a telephone network or the Internet. Accordingly, the processing portion 50 can exchange necessary data with the portable terminal via the communications portion 60.

The projection devices 42 display a desired hologram above the ramp 25. In the present embodiment, a hologram can be formed by superposition of video images from two projection devices 42. Note that the video images may be projected in a state where droplets or the like are sprayed. In this case, a device configured to spray droplets may be provided on a lateral side of the ramp 25, the projection devices 42, or the like. Further, the projection devices 42 may just display two-dimensional video images on the surface of the ramp 25.

A door controlling portion 70, a vehicle-height controlling portion 80, and a ramp controlling portion 90 are connected to the processing portion 50, and the opening and closing of the slide door, the vehicle height, and the deployment of the ramp are controlled by these controlling portions. That is, a door opening and closing mechanism 72 is connected to the door controlling portion 70, and the opening and closing of the slide door 2 is controlled by the door opening and closing mechanism 72. The vehicle-height adjusting mechanisms 82 are connected to the vehicle-height controlling portion 80 and control the vehicle height. Respective vehicle-height adjusting mechanism 82 are provided in four suspension members, for example, and the vehicle-height adjusting mechanisms 82 adjust distances from the four tires 3 to the vehicle body 4 so as to adjust the vehicle height. Note that, in FIG. 1, one vehicle-height adjusting mechanism 82 is illustrated schematically. A ramp drive mechanism 92 is connected to the ramp controlling portion 90 and controls deployment and storage of the ramp 25. The ramp drive mechanism 92 can be configured to deploy and store three step boards, for example, by expansion and contraction of wires, or the like. FIG. 1 illustrates a stored state of the ramp 25, and FIG. 2 illustrates a deployed state of the ramp 25. In the deployed state of the ramp 25, a user on a wheelchair can get on and off the vehicle 1 by use of the ramp 25. Note that, in terms of the vehicle height adjustment, the vehicle height can be adjusted to be suitable for a person waiting to get on the vehicle 1 by detecting the length of the legs (the physical size) of the person.

Note that, in terms of individual configurations of the above members, various configurations that have been known conventionally can be employed.

Process at Vehicle Stop

Figure 4:
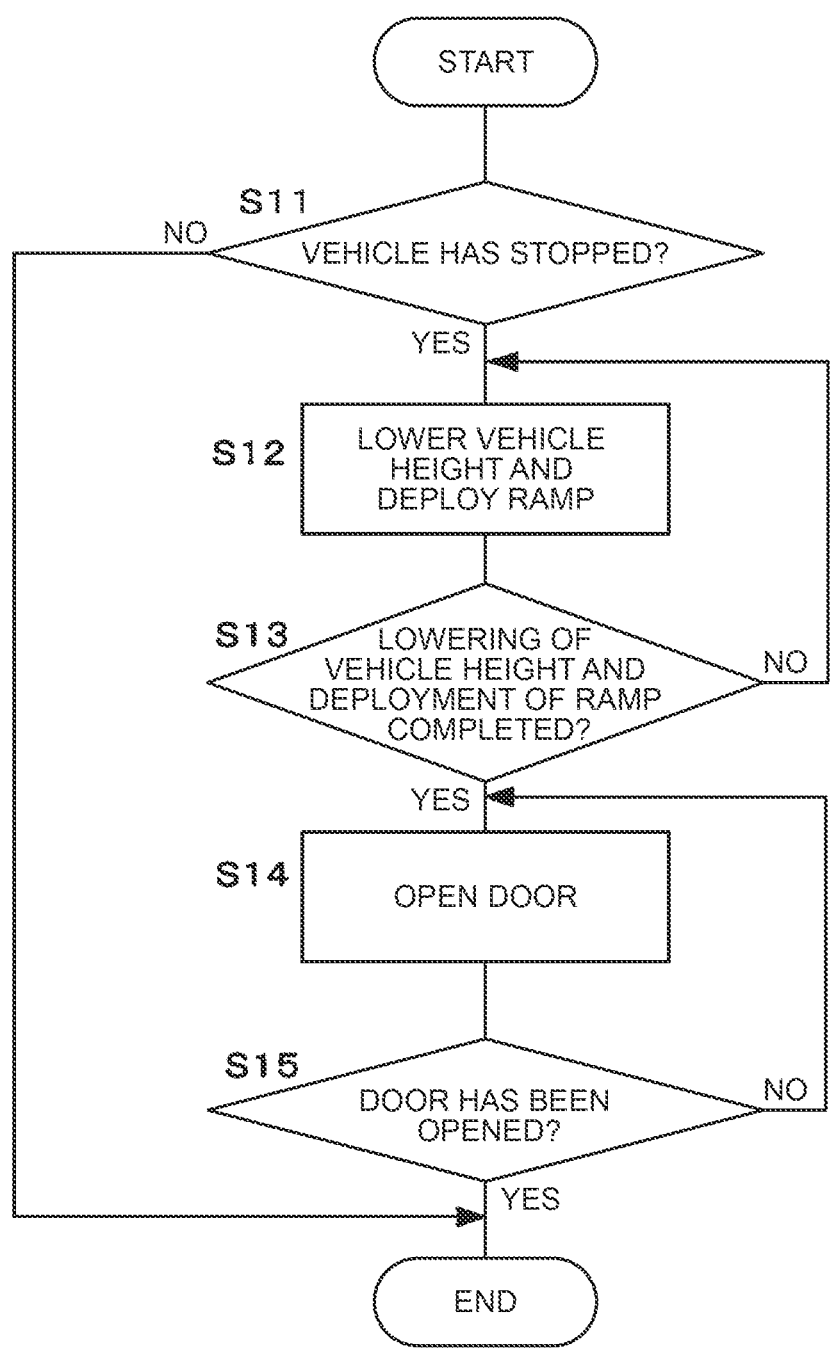
FIG. 4 is a flowchart illustrating an operation at the time of vehicle stop.

FIG. 4 is a flowchart illustrating an operation at the time of vehicle stop. First, in a case where the vehicle 1 arrives at a stop or the like and stops, the processing portion 50 determines whether or not the vehicle 1 has stopped (S11). When the vehicle 1 has stopped, the processing portion 50 lowers the vehicle height and deploys the ramp 25 (S12). Then, the processing portion 50 determines whether or not the lowering of the vehicle height (vehicle height adjustment) and ramp deployment have been completed (S13), and when they have been completed, the processing portion 50 opens the slide door 2 (S14). When an opening operation of the slide door 2 has been completed (YES in S15), the processing portion 50 ends the process.

Thus, the slide door 2 is opened after the vehicle height adjustment and the deployment of the ramp 25 have been completed. A user gets on or off the vehicle 1 in a state where the slide door 2 is opened.

Process at Vehicle Start

Figure 5:
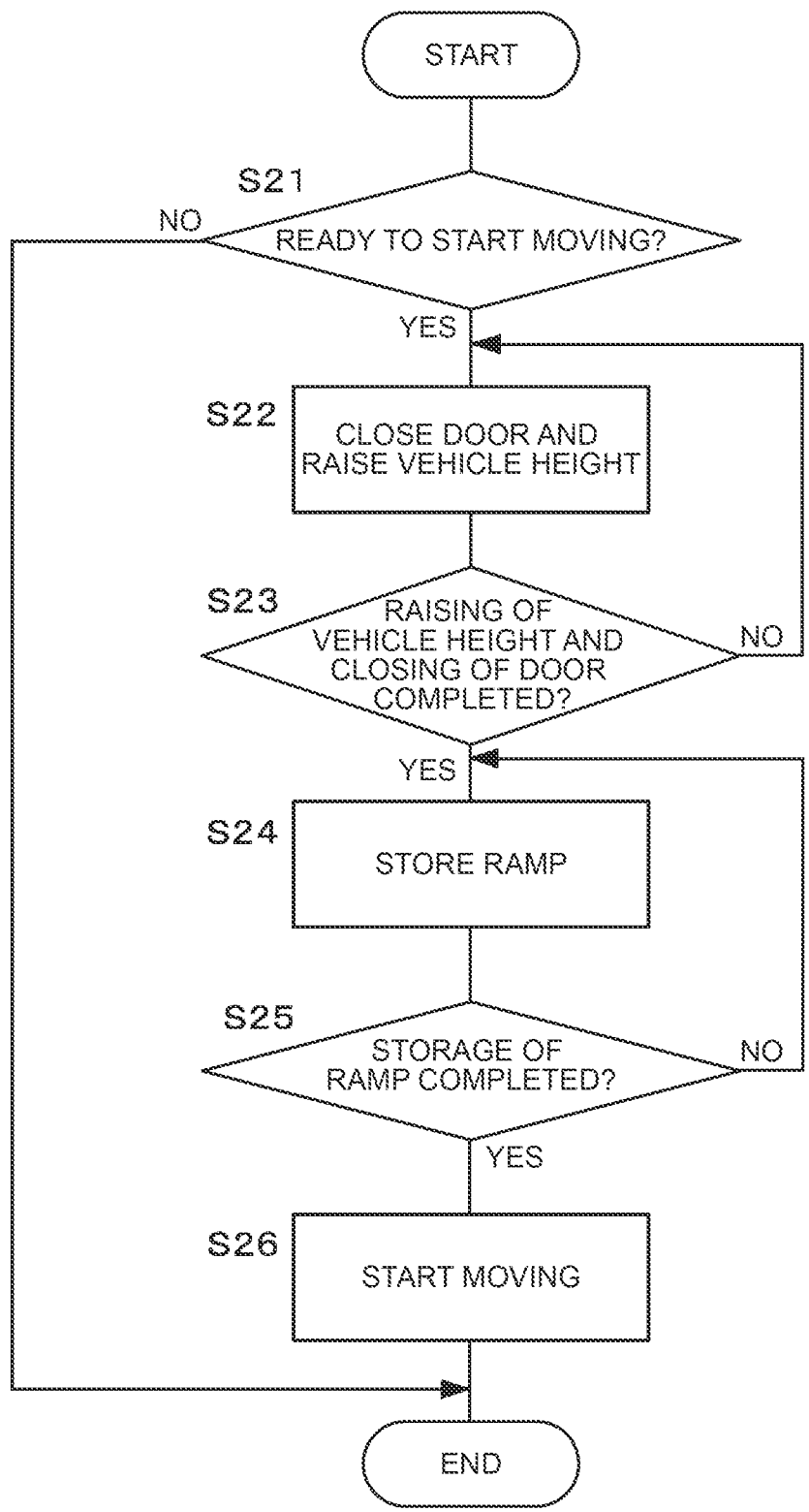
FIG. 5 is a flowchart illustrating an operation at the time of vehicle start.

FIG. 5 is a flowchart illustrating an operation at the time of vehicle start. First, the processing portion 50 determines whether or not the user has got on or off the vehicle 1 at the stop and the vehicle 1 is ready to start moving (S21). Whether the vehicle 1 is ready to start moving or not may be determined by determining whether the user has got on or off the vehicle 1 based on an image from the camera 40 or the like or may be determined based on an operation on a vehicle start button by an occupant, an instruction from a management center, or the like. When the vehicle 1 is ready to start moving, the processing portion 50 closes the slide door 2 and raises the vehicle height (S22). Then, the processing portion 50 determines whether or not the raising of the vehicle height and the closing of the door have been completed (S23), and when they have been completed, the processing portion 50 stores the ramp 25 (S24). Then, the processing portion 50 determines whether or not the storing of the ramp has been completed (S25), and when the storing of the ramp has been completed, the vehicle 1 starts moving (S26).

Thus, the ramp 25 is stored after the vehicle height adjustment and the closing of the door have been completed, and then, the vehicle 1 starts moving.

Interruption of Raising of Vehicle Height

Figure 6:
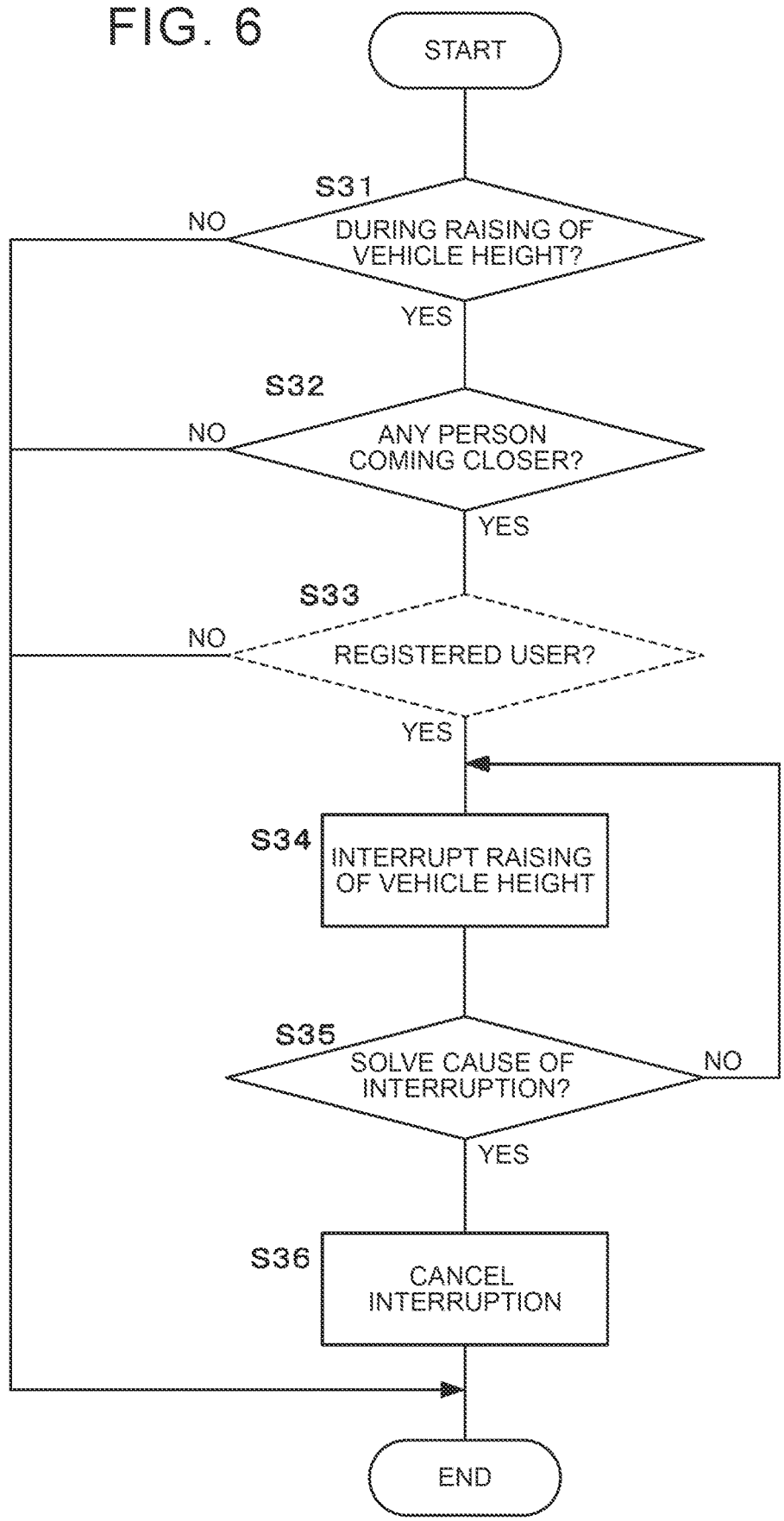
FIG. 6 is a flowchart illustrating an operation of an interruption process while a vehicle height is being raised.

FIG. 6 is a flowchart illustrating an operation of an interruption process during raising of the vehicle height. First, the processing portion 50 determines whether or not the operation of raising the vehicle height is being performed (S31). The raising of the vehicle height (S22: the raising of the vehicle height and the closing of the door) is performed after the vehicle 1 is ready to start moving. Accordingly, in the case of YES in S31, there should be no user who is about to get on or off the vehicle 1, around the doorway.

In this state, based on images from the camera 40, the processing portion 50 determines whether or not there is a person coming closer to the doorway (S32). In some embodiments, the person to be checked here based on the images from the camera 40 is limited to a person who can reach the doorway in a short time at high speed, e.g., a person running to come closer to the vehicle 1 (a person who is about to rush into the vehicle 1), or the like. The processing portion 50 can detect the timing when the raising of the vehicle height is finished and the timing when the closing of the door is finished, based on information from the vehicle-height adjusting mechanisms 82 and the door opening and closing mechanism 72. Further, the processing portion 50 can also detect the speed of the person coming closer to the vehicle 1, based on changes with time in the images from the camera 40. Accordingly, the processing portion 50 predicts a position of the person coming closer to the vehicle 1 at the timing when the raising of the vehicle height is finished, and only in a case where the position is within a predetermined distance (e.g., within a few meters) from the vehicle 1, and the speed of the person is a predetermined speed or more (the person is running), the processing portion 50 can determine that there is a person coming closer to the vehicle (YES in S32).

Subsequently, the processing portion 50 determines whether the person coming closer to the vehicle 1 is a registered user or not (S33). For example, in a case where the vehicle 1 is a shuttle bus, when the person has a commuter pass (commuter data), a ticket (ride data), or the like, the person registers the data in a portable terminal or the like as a user. Accordingly, the processing portion 50 can determine, based on the data, whether the person is a registered user or not, and when the person is a registered user, the processing portion 50 can determine that the person is a boarding scheduled person who is to get on the vehicle 1. More specifically, the processing portion 50 checks an ID or the like by communicating with the portable terminal possessed by the user. The determination in S33 is effective when people other than registered users do not use the vehicle 1 and should be employed as an option. By the determination in S33, it is possible to exclude people who are coming closer to the vehicle 1 during jogging and not scheduled to get on the vehicle 1. Thus, the processing portion 50 and the communications portion 60 function as a checking unit configured to check a boarding scheduled person.

When the person is a registered user, the processing portion 50 interrupts the operation of raising the vehicle height (S34). Subsequently, the processing portion 50 determines whether the cause of the interruption is solved or not (S35). For example, in cases such as a case where the person coming closer to the vehicle 1 has got on the vehicle 1 or a case where the person coming closer to the vehicle 1 has stopped at a distance from the door, the processing portion 50 can determine that the cause of the interruption is solved.

When the cause of the interruption is solved, the processing portion 50 cancels the interruption (S36) and then completes the raising of the vehicle height and the closing of the door.

Note that the closing of the door may be also interrupted as well as the raising of the vehicle height. Further, only either of the closing of the door and the raising of the vehicle height may be interrupted in accordance with a distance from the doorway to the person coming closer to the vehicle 1. For example, when the person coming closer to the vehicle 1 is relatively far from the vehicle 1 and is estimated not to reach the vehicle 1 before the closing of the door is completed, it is conceivable that only the raising of the vehicle height is interrupted without interrupting the closing of the door.

Thus, when a person is coming closer to the vehicle 1 during the raising of the vehicle height, the raising of the vehicle height is interrupted. When the vehicle height is being raised, at least a vehicle-body side of the ramp 25 is raised. Accordingly, in a case where the ramp 25 is being raised when a person running to the vehicle 1 tries to get on the ramp 25, if the person does not recognize that the ramp 25 is being raised, the leg of the person may be strained or the person may sway. The present embodiment can restrain occurrence of such a situation.

Others

In addition to or instead of the interruption of the raising of the vehicle height in S34 in FIG. 6, a display is exhibited to suggest the person that the person refrain from rushing into the vehicle 1.

For example, a hologram of an image (e.g., a human being) may be displayed near the ramp by the projection devices 42, or an image can be displayed by the projection devices 42 by projection mapping with steam being contained in an air curtain. Further, the following methods are also conceivable: an image is colored in outstanding colors such as red; a no-entry mark is displayed; and light in a color different from colors of things around the vehicle 1 is just projected on the ramp.

What is claimed is:

1. A ramp-equipped vehicle comprising:
   a vehicle-height adjusting mechanism configured to adjust a vehicle height of the vehicle;
   a ramp configured to be movable between a deployed state and a stored state, the deployed state being a state where the ramp protrudes outwardly from the vehicle, the stored state being a state where the ramp is stored inside the vehicle; and
   a camera configured to detect a person coming closer to the vehicle, wherein, when the camera detects a person coming closer to a doorway of the vehicle during vehicle height adjustment by the vehicle-height adjusting mechanism, the vehicle height adjustment by the vehicle-height adjusting mechanism is interrupted.

2. The ramp-equipped vehicle according to claim 1, further comprising a checking unit configured to check whether or not the person coming closer to the vehicle is a boarding scheduled person, by communicating with a terminal of the boarding scheduled person, wherein, when the checking unit confirms that the person coming closer to the vehicle is the boarding scheduled person during the vehicle height adjustment, the vehicle height adjustment is interrupted.

* * * * *